UNITED STATES PATENT OFFICE 2,543,092

DIMERIZATION OF VINYLCYCLOHEXENE

Frances J. Bondhus, Oskaloosa, Iowa, and Herbert L. Johnson, Media, Del., assignors to Sun Oil Company, Philadelphia, Pa., a corporation of New Jersey No Drawing. Application November 16, 1945, Serial No. 629,194

18 Claims. (Cl. 260—666)

1

This invention relates to the polymerization of vinylcyclohexene. More particularly it provides a process for the polymerization of vinylcyclohexene to desired novel polymers thereof, especially the dimer product.

Vinylcyclohexenes are well known chemical compounds and are represented by the formulae

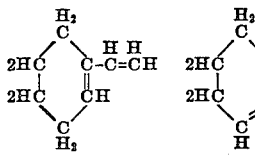 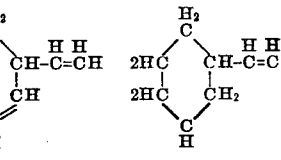 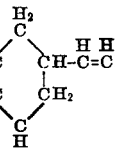

(I) Vinylcyclohexene-1    (II) Vinylcyclohexene-2    (III) Vinylcyclohexene-3

The invention relates to the polymerization of any one or more of the vinylcyclohexenes indicated by I, II and III. Hereinafter wherever the term "vinylcyclohexene" is employed the above compounds are intended, unless otherwise stated.

According to the invention, vinylcyclohexene can be polymerized by subjecting it to the action of certain acids under specified conditions for a time sufficient to cause a desired extent of polymerization as will appear more fully hereinafter.

In one embodiment of the invention, vinylcyclohexene is commingled with the acid of desired concentration at a specified temperature for a time sufficient to cause a desired extent of polymerization to occur. This step can be advantageously effected employing an agitator.

Various acids can be employed in carrying out the invention. Sulfuric acid has been found to yield good results. The invention contemplates not only the polymerization of vinylcyclohexene to relatively high molecular weight products but it also deals with a controlled polymerization to prepare a vinylcyclohexene dimer product in good yield with minimum formation of heavier polymers.

To effect the polymerization of vinylcyclohexene generally, sulfuric acid of a concentration in excess of 25% can be employed. It has been found that in order to effect dimerization a concentration within the range 35%-65% should be employed. As a matter of interesting fact there appears to be a maximum yield of dimer product, with concomitant minimum yield of heavier polymers, when the concentration of

2 the sulfuric acid is about 45%-55%. Sulfuric acid of concentration varying from about 25% to about 100% has been employed but, as stated, it is with the concentrations lying within the range 45%-55% that the remarkably higher yields of dimer product have been obtained together with the attendant lowered yield of heavier polymers. This is noteworthy particularly in view of the known fact that for the usual controlled polymerization reactions employing sulfuric acid much higher concentrations are currently employed. Further when employing the concentration of sulfuric acid preferred in this invention, for the preparation of the dimer product it would be expected that hydration of the olefin bond would occur. This makes the discovery of the preferred ranges all the more remarkable.

Depending at least to an extent upon the concentration of the acid employed and the degree of polymerization desired the temperature will vary within the range 50° C.-150° C., preferably 120° C.-130° C. However, temperatures outside that range are not excluded from the scope of the invention. In the preparation of the dimer product the temperature will be in the preferred range recited.

Operating within the broad range of acid concentrations given herein, the time required to effect the desired polymerization will vary from about 0.5 hour to 8 hours. Lesser or greater times are not excluded from the scope of the invention.

Generally speaking acid concentration, temperature and time are compensating variables.

Pressure is not believed to be an important variable. However, when operating above about 130° C. with the preferred acid concentrations, the application of slightly higher pressure is advantageous to aid in the retention of vinylcyclohexene within the apparatus. Accordingly, atmospheric or higher or lower than atmospheric pressures are not excluded from the scope of the invention, although other than that stated, there appears to be no particular advantage to operation at other than atmospheric pressure.

While the invention has been described employing sulfuric acid other acids which will polymerize vinylcyclohexene can be employed. Phosphoric acid can be employed preferably in concentrations in excess of 60%. Hydrofluoric acid can also be employed preferably in concentrations in excess of 80%.

The following are examples according to the invention:

*Example I*

In a flask equipped with stirrer, reflux condenser and separating funnel, is placed 1 mole of 1-vinylcyclohexene-3 and 1.5 moles of 45% sulfuric acid is added, with vigorous stirring, while the temperature is raised and maintained at the reflux temperature for a period of 10 hours. The reaction mass is cooled and the hydrocarbon layer separated and distilled at 5 mm. Hg pressure. The yields were:

|  | Per cent |
|---|---|
| Dimer | 35 |
| Higher polymer | 15 |
| Unconverted vinylcyclohexene | 50 |

The unconverted vinylcyclohexene can be recycled thereby obtaining a conversion of about 70 per cent of dimer product.

*Example II*

Using the same apparatus as described in Example I, 1.5 moles of 70 per cent sulfuric acid was reacted with one mole of 1-vinylcyclohexene-3 at 100° C. for a period of one hour. The yields were:

|  | Per cent |
|---|---|
| Dimer | 31 |
| Higher polymer | 55 |
| Unconverted vinylcyclohexene | 14 |

*Example III*

Using 1 mole of 1-vinylcyclohexene-3 and 2 moles of 85% phosphoric acid as the catalyst at a temperature of 60° C.–70° C. for a period of five hours with the same apparatus as described in Example I, the yields were:

|  | Per cent |
|---|---|
| Dimer | 10 |
| Higher polymer | 15 |
| Unconverted vinylcyclohexene | 75 |

The dimer product is a pale yellow liquid having a boiling point of 118° C.–119° C. at 5 millimeter mercury, a refractive index of 1.5274 $n_D^{25°C}$ and a pungent odor resembling that of pine oil.

In co-pending application Serial No. 630,694, filed November 24, 1945, by the instant inventors, is described and claimed the product obtained when hydrogenating vinylcyclohexene dimer in presence of Raney nickel at a pressure of about 2,000 lbs./sq. in. and at a temperature within the range 100° C.–175° C. The hydrogenated dimer has utility as a plasticizer, spraying oil, and the like.

While the foregoing examples are of batch operations it will be understood by those skilled in the art that the invention can be effected in continuous manner. Thus, the invention provides a commercially feasible process which with recycle of unconverted starting material will give high yields of desired polymers.

We claim:

1. The method of dimerizing vinylcyclohexene which comprises subjecting it at a temperature in the range 50° C.–150° C. to the action of an acid catalyst for a time sufficient to cause dimerization, and separating a dimer of said vinylcyclohexene from the reaction mixture.

2. The method of dimerizing vinylcyclohexene which comprises subjecting it at a temperature in the range 50° C.–150° C. to the action of sulfuric acid for a time sufficient to cause dimerization, and separating a dimer of said vinylcyclohexene from the reaction mixture.

3. The method of dimerizing vinylcyclohexene which comprises subjecting it at a temperature in the range 50° C.–150° C. to the action of phosphoric acid for a time sufficient to cause dimerization, and separating a dimer of said vinylcyclohexene from the reaction mixture.

4. The method of dimerizing vinylcyclohexene which comprises subjecting it at a temperature in the range 50° C.–150° C. to the action of hydrofluoric acid for a time sufficient to cause dimerization, and separating a dimer of said vinylcyclohexene from the reaction mixture.

5. Process according to claim 2 wherein the concentration of the acid employed is in excess of 25%.

6. Process according to claim 3 wherein the concentration of the acid employed is in excess of 60%.

7. Process according to claim 4 wherein the concentration of the acid employed is in excess of 80%.

8. The method of dimerizing 1-vinylcyclohexene-3 which comprises subjecting it at a temperature in the range 50° C.–150° C. to the action of an acid catalyst for a time sufficient to cause dimerization, and separating a dimer of said vinylcyclohexene from the reaction mixture.

9. The method of dimerizing 1-vinylcyclohexene-3 which comprises subjecting it at a temperature in the range 50° C.–150° C. to the action of sulfuric acid for a time sufficient to cause dimerization, and separating a dimer of said vinylcyclohexene from the reaction mixture.

10. The method of dimerizing 1-vinylcyclohexene-3 which comprises subjecting it at a temperature in the range 50° C.–150° C. to the action of phosphoric acid for a time sufficient to cause dimerization, and separating a dimer of said vinylcyclohexene from the reaction mixture.

11. The method of dimerizing 1-vinylcyclohexene-3 which comprises subjecting it at a temperature in the range 50° C.–150° C. to the action of hydrofluoric acid for a time sufficient to cause dimerization, and separating a dimer of said vinylcyclohexene from the reaction mixture.

12. Process according to claim 9 wherein the concentration of the acid employed is in excess of 25%.

13. Process according to claim 10 wherein the concentration of the acid employed is in excess of 60%.

14. Process according to claim 11 wherein the concentration of the acid employed is in excess of 80%.

15. The method of dimerizing 1-vinylcyclohexene-3 which comprises subjecting it at a temperature in the range 50° C.–150° C. to the action of sulfuric acid having a concentration in the range 35%–65% for 0.5 hour–8 hours, and separating a dimer of said vinylcyclohexene from the reaction mixture.

16. The method of dimerizing 1-vinylcyclohexene-3 which comprises subjecting it at a temperature in the range 50° C.–150° C. to the action of sulfuric acid having a concentration in the range 35%–65% for a time sufficient to cause dimerization, and separating a dimer of said vinylcyclohexene from the reaction mixture.

17. 1-vinylcyclohexene-3 dimer.

18. The dimer of vinylcyclohexene which is a liquid having a boiling point of 118° C.–119° C. at 5 millimeters mercury and a refractive index of 1.5274 $n_D^{25°}$ C.

FRANCES J. BONDHUS.
HERBERT L. JOHNSON.

REFERENCES CITED

The following references are of record in the file of this patent:

UNITED STATES PATENTS

| Number | Name | Date |
|---|---|---|
| 1,885,060 | Hofmann et al. | Oct. 25, 1932 |
| 2,182,617 | Michel | Dec. 5, 1939 |
| 2,401,414 | Doumani et al. | June 4, 1946 |

FOREIGN PATENTS

| Number | Country | Date |
|---|---|---|
| 343,116 | Great Britain | Feb. 16, 1931 |

OTHER REFERENCES

Whitby et al.: Can. J. Research 6, 203 to 225 (1932).

Lebedev: J. Russ. Phys. Chem. Soc., 42, pages 949 et seq. (1910).

Ellis: Chem. Synthetic Resins, vol. 1, pages 174 and 175.

Carter et al.: J. Soc. Chem. Ind., 44, 543T to 546T (1925).